United States Patent
Liu et al.

(10) Patent No.: US 7,343,266 B2
(45) Date of Patent: Mar. 11, 2008

(54) SYSTEM AND METHOD FOR METADATA VERIFICATION DURING MEASUREMENT PROCESSING

(75) Inventors: Jerry J. Liu, Sunnyvale, CA (US); Bruce Hamilson, Menlo Park, CA (US); Jefferson B. Burch, Palo Alto, CA (US)

(73) Assignee: Agilent Technologies, Inc., Santa Clara, CA (US)

( * ) Notice: Subject to any disclaimer, the term of this patent is extended or adjusted under 35 U.S.C. 154(b) by 0 days.

(21) Appl. No.: 11/289,810

(22) Filed: Nov. 30, 2005

(65) Prior Publication Data

US 2007/0124116 A1    May 31, 2007

(51) Int. Cl.
*G06F 17/00* (2006.01)
(52) U.S. Cl. .............. 702/189; 702/187; 702/127; 713/171
(58) Field of Classification Search ............ 702/189, 702/179, 187
See application file for complete search history.

(56) References Cited

U.S. PATENT DOCUMENTS 7,043,637 B2 *   5/2006  Bolosky et al. ............. 713/171
2003/0061195 A1   3/2003  Laborde et al.
2004/0122863 A1 * 6/2004  Sidman .................. 707/104.1
2004/0156505 A1 * 8/2004  Yanagita ................... 380/263
2004/0243827 A1 * 12/2004 Aguilera et al. ............ 713/200
2005/0020253 A1 * 1/2005  Pasteanu .................. 455/418
2006/0212460 A1 * 9/2006  Boggs ..................... 707/100
2006/0253484 A1   11/2006 Bangalore et al.
2007/0038890 A1 * 2/2007  El Far et al. ................ 714/25

FOREIGN PATENT DOCUMENTS

WO      2005106654      11/2005

OTHER PUBLICATIONS

GB Search Report Dated Feb. 27, 2007.
Eugene Durr, University of Delhi—"Measurement Data Structures, Metadata Schema's And Ingest Procedures"; Deliverable A.1; Oct. 8, 2004, Version 1.1; pp. 1-25.

* cited by examiner

*Primary Examiner*—Hal Wachsman

(57) ABSTRACT

A system and method of verifying metadata in a measurement processing system is described. Each combination of metadata is associated with a key, and the keys are used to verify that operations performed using the measurements are valid based on the metadata of the respective measurements. Embodiments allow metadata verification to be made prior to operating on measurements. Embodiments also minimize the processing that results from making such checks redundantly causing slowdown in the measurement processing.

18 Claims, 2 Drawing Sheets

| OPERAND 1 KEY | OPERAND 2 KEY | OPERAND n KEY | RESULT | ACTION |
|---|---|---|---|---|
| 1123ss32 | 43443dr45 | 3344fd3 | YES | |
| 223 | 2323 | 76556 | NO | |
| hghg36 | hbjhj22 | sssbb455 | TRANSFORM -1 | {1:CONVERT UNIT(CELSIUS)} |
| 1123ss32 | 223 | sss454 | TRANSFORM -1, TRANSFORM 2 | {1:CONVERT UNIT(METER)} {2:CONVERT UNIT(METER)} |
| | | | | |
| | | | | |
| | | | | |
| | | | | |
| | | | | |

SYSTEM AND METHOD FOR METADATA VERIFICATION DURING MEASUREMENT PROCESSING

TECHNICAL FIELD

The concepts described herein relate to measurement processing systems and methods which have metadata associated with the measurement values.

BACKGROUND OF THE INVENTION

Measurement systems consist of sensors which collect data about real world conditions, and measurement processing program logic (often referred to individually as function blocks, as, for example, used in the terminology of IEEE Standard 1451.1), which performs operations on these measurements. There may be multiple function blocks within a system, and each function block can perform a specific function such as thresholding or averaging. The functions, or operations, may be arithmetic or logical in nature. For instance, one may wish to compare a radio frequency (RF) signal measurement to a threshold, or average a number of temperature measurements together. Each of these individual processing operations would be performed by, and encompassed within, a function block.

Measurements are more than just numerical values, even though they are usually thought of, and treated as, simple numbers. Most of the time, however, they have additional attributes, called metadata, which contribute meaning to the measurement. For instance, a temperature measurement may have a value of 78, together with metadata that describes that the numerical value is represented in degrees Fahrenheit. Another piece of metadata associated with the temperature measurement may be uncertainty, which, for example, denotes that the value 78 has an uncertainty of plus or minus one degree.

In processing measurements it is necessary to take these metadata into consideration for the processing operations to be meaningful. Two numbers can always be added together. But it may not be a proper operation to add the numerical values for two measurements, depending on the nature of the measurements. The metadata can be used, for example, by the function blocks to determine whether or not an operation is permissible.

In current practice, the logic of whether or not a given operation is permissible is often embedded in the function block. That is, the measurement processing program is written expecting a certain type of measurement. This approach has the advantage of simplicity, but it has the drawback of being prone to error, especially in an environment where there may be different types of measurements (such as different measurement units) present in the system. For example, if the program logic is expecting to operate on measurements in Celsius, and a measurement based on Fahrenheit is introduced, the program will produce erroneous results.

Another common approach is to provide the measurement, with its numerical value and associated metadata, to the function block, and let the function block decide whether or not a certain operation is valid based on the metadata. For instance, if a function block received two measurements to be compared, it can check to see if the two measurements have the same unit, if the two values have the same scale properties, etc., before operating on the measurement. If the two measurements are not compatible, for instance one is Celsius and the other Fahrenheit, the measurements can be transformed appropriately before being processed. The disadvantage with this approach is that it is tedious. Having to make the appropriate background checks before every operation slows down the system.

BRIEF SUMMARY OF THE INVENTION

The concepts set forth herein describe a system and method for verifying metadata in measurement processing systems. Instead of ignoring metadata or performing verifications on every piece of metadata associated with each measurement, the concepts set out herein describe a system and method for associating a combination of metadata with a unique value or string that represents that particular combination of metadata. The unique value or string, which can be referred to as a key, can then be stored and used to determine the validity of operations involving the combination metadata it represents. The first time a particular string, or key, is seen a determination is made, using the actual metadata, as to whether the requested operation is valid for that particular metadata. A single-operand operation will look at a single key, while a multiple-operand operation will look at a set of keys. Once a determination is made as to whether the operation is proper or improper based on the actual metadata, the key, or set of keys, is stored along with the results of the determination, and the keys are used for subsequent requests for that operation having the same key, or set of keys In an embodiment, a measurement processing system associates a unique string to each measurement, where the unique string represents a specific combination of metadata. The system includes one or more function blocks which receive measurements and their associated unique strings and perform operations on the measurements. The function block is connected to a history cache which stores the unique strings that have been seen by the function block, and whether those unique strings correspond to a valid operation on the measurements. The function block is able to look up unique strings in the history cache to determine if the requested operation is a valid operation, and what steps to take if the requested operation is not valid.

In another embodiment, a method of verifying metadata is described. A key is associated with a specific combination of metadata, and a particular operation involving the measurement or associated with the key, or measurements associated with a set of keys is determined to be proper or improper based on the value of the key, or set of keys.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWINGS

For a more complete understanding of the present invention, reference is now made to the following descriptions taken in conjunction with the accompanying drawing, in which:

FIG. 3 is an example of an embodiment of the contents of a history cache in accordance with the concepts described herein.

DETAILED DESCRIPTION OF THE INVENTION

The concepts described herein allow proper metadata verification to be made prior to operating on measurements. At the same time, it minimizes the processing that results from making such checks redundantly causing slowdown in the measurement processing. This additionally makes metadata verification feasible for devices with limited CPU resources, such as, for example, mobile devices.

In an embodiment of the measurement processing system described herein, each measurement instance has associated with it one or more pieces of metadata. Instead of ignoring or individually processing each piece of metadata, the measurement processing system assigns or generates a character string or value, which uniquely represents the set of metadata associated with the measurement. The character string can be a numerical value, a character string, or a representation that uniquely identifies the set, or combination, of metadata to which it is associated. This unique string can be referred to as a key representing the combination of metadata. This string, or key, is then used to annotate its associated measurement. Each key uniquely represents all, or a specific subset of, the metadata associated with each measurement instance. A combination of metadata may have more than one key, but each key should represent only one combination of metadata.

For example, consider an instance of a temperature measurement with a value attribute of "78", a unit attribute of "° Celsius", and an uncertainty of "+/−1° C.". This combination of metadata may be assigned a key of "1122". In this example the key "1122" would always be associated with a temperature measurement with a unit attribute "° Celsius" and an uncertainty of "+/−1° C.".

All the entities, either sensors or other function blocks, in the measurement system which generates the measurement assign or generate keys based on the same algorithm. It is permissible for an entity to not generate a key for a measurement, but when it does generate a key, it uses the same algorithm as the other entities within the system. As an example, in embodiments, keys can be generated as a hash, and the algorithm which generates the keys can be a "hash function".

In order for the keys to be useful, each function block must keep track of which metadata combinations are associated with which keys for each key that the function block has encountered. To accomplish this, each function block maintains a history cache. The cache contains the keys of the measurement operands that it has encountered before and whether or not the operation is permissible.

Figure 1:
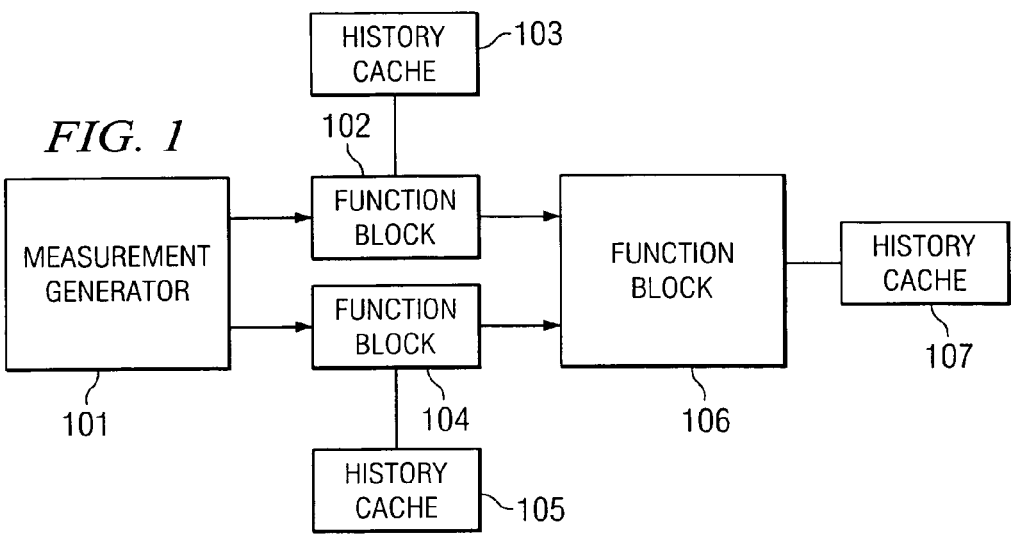
FIG. 1 is a simplified block diagram of an embodiment of a system for verifying metadata during measurement processing.

Referring now to FIG. 1, an embodiment of a measurement processing system according to the concepts described herein is shown. Measurement processing system 100 includes one or more measurement generators 101 which are sensors designed to provide measurement instances. Measurement generators attach metadata to the measurement instances which add context to the measurement itself. Metadata can be any information associated with the measurement that can provide context to the measurement itself. The measurements, using the example of the embodiment shown in FIG. 1, and associated metadata are sent to function blocks 102 and 104 for processing. Each function block 102 and 104 can, as required, send its results, or a subset of its results, to additional function blocks, such as function block 106 for additional processing. While FIG. 1 shows an example of three function blocks, any number or combination of function blocks, connected in any manner, can be used to accomplish the desired result.

As described above, each function block 102, 104, and 106, process, or perform a function on the measurements received from measurement generator 101. Each function can be anything from a simple function, such as an add, subtract, average, or threshold determination, or a network of complex processing functions such as FFTs which are composed of many basic arithmetic and logical operations.

Each function block 102, 104 and 106 has an associated history cache 103, 105 and 107, respectively. History caches 103, 105 and 107 are used to store keys associated with metadata combinations seen by their respective function block, and an indication of whether the associated operation is permissible.

When function block 102, 104 or 106 receives measurements to be acted on, it retrieves the keys associated with the measurements. As each measurement has an associated key, and function block 102, 104 or 106 could be performing an operation that involves two or more measurements, the function block will, in many cases, have a set of two or more keys associated with a particular operation. Function block 102, 104 or 106 checks its history cache to see if the key (in the case of a single operand operation), or set of keys (in the case of a multiple operand operation), of the requested operation is a key, or set of keys, that have previously been encountered by the function block. If the key, in single operand operations, or keys, in multiple operand operations, has previously been encountered, the function block can then extract the results of the check and know immediately whether the requested operation is a permissible operation. If the key, or set of keys, is one that it has not seen before, attribute checks are performed on the metadata associated with the key, or keys, to check to see if the operation permissible, i.e. the metadata of the measurements to be operated on allow the requested operation. The result of the check is then recorded in the appropriate history cache 103, 105 or 107 for future reference on operations using this key, or set of keys.

If the results of the operation of the function block create a new measurement with new associated metadata, a new key must be generated or assigned to the new metadata. The function block, therefore, can have (or share with other function blocks) a key assignment or generation algorithm so that a key is generated and attached to the new measurement.

In the embodiment shown in FIG. 1, each function block 102, 104 or 106 is shown with its own history cache 103, 105 or 107. Providing each function block with its own history cache may be advisable because while one type of operation is acceptable for a set of measurements, another type of operation may not be acceptable for the same set of measurements. In other embodiments, however, function blocks may share a history cache where function blocks perform the same operations or where the history cache is constructed to indicate the types of operations for which a set of keys may be proper.

The key can be generated by using a hash of the types and values of the metadata. A representation of the key may be a number with many digits. As stated, a particular configuration of metadata may map to multiple key values, but each key value should map to only one particular configuration of metadata.

One advantage of using keys and a history cache to verify metadata is that the function blocks are then adaptable to changes in measurement data, but retain the performance characteristics of systems that do not check metadata before performing operations. In most measurement systems, the types of the measurements change infrequently, therefore the function blocks in a system will normally see only the same metadata. In this case the keys seen by the function block will have been previously verified and the check of the history cache will reveal that the operation is proper. This check can be performed very quickly allowing the system to essentially retain the performance of the non-checking systems. For example, a temperature sensor should almost always produce temperature measurements with a given unit and specific uncertainty. However, there may be changes, as sensors are replaced, reprogrammed or serviced. The present system is able to accommodate the changes while still reducing the number of verifications that need to be made.

Additionally, embedded devices, such as those commonly used in measurement processing systems, often have limited memory available. In such cases the metadata, or attributes, for a measurement can be stored in a central store, and measurements can be sent to program logic with the key and with a pointer to a memory where the metadata is be stored. If the program logic requires the metadata, it can then be queried from the central store.

Function blocks 102, 104, and 106 are preferably software modules programmed to implement a specific function, where the software modules are loaded and run on a processor. The processor may be part of a general purpose computer, part of a mobile device such as a cellular phone or personal digital assistant, or part of an special purpose computer constructed for a particular purpose. While the function blocks are preferably implemented in software, it is within the scope of the concepts disclosed herein to implement the function blocks in hardware using gate arrays or equivalent technology.

Figure 2:
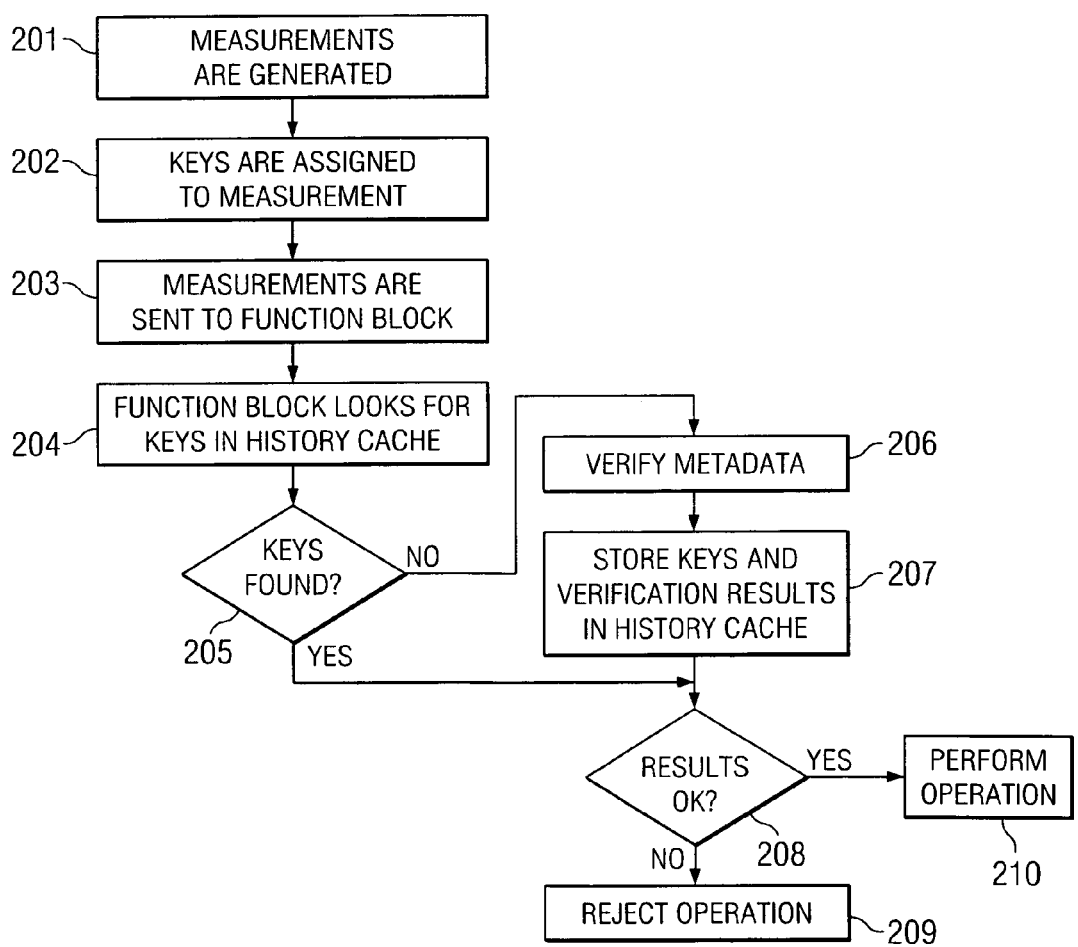
FIG. 2 is a flow chart of an embodiment of a method of verifying metadata during measurement processing.

Referring now to FIG. 2, an embodiment of a method of verifying metadata during measurement processing is described. Reference is made to measurement system 100 of FIG. 1 to aid in the understanding of method 200. Method 200 begins with the generation of measurement data as shown by process 201. Process 202 then assigns keys the generated measurement data based on the metadata associated with the measurement data. After a key is associated with the measurement data, process 203 sends the measurement data and its associated keys to the proper function blocks, such as function blocks 102, 104 or 106 from FIG. 1. Process 204 causes the function block to look in the history cache for the key or set of keys. Process 205 determines whether the key or set of keys is found in the history cache. If the key or set of keys is not found, process 206 operates to verify the metadata associated with the measurement data. After the metadata has been verified, the method passes to process 207 where the newly generated key or keys are stored along with the associated verification results in the history cache, before passing to process 208.

Returning to process 205, if the key or keys are found in the history cache, process 208 determines if the requested operation is proper according to the verification of the metadata, either from the history cache or from the verification performed in process 207. If process 208 determines that the requested operation is proper, process 210 performs the operation. If, in process 208, it is determined that the operation is improper, process 209 rejects of the requested operation. If the operation is determined to be improper, the function block can reject the operation outright, or it can examine the metadata associated with the operation directly.

If, upon examining the metadata, the function block determines that the operation would be valid if one or more of the measurements is converted in some way, the function block can act to convert the measurement, for example a temperature can be converted from Fahrenheit to Celsius, the function block can then perform the operation. The history cache, therefore, can also be configured to contain a description of what kind of conversion is to be done based on the entries in the history cache. Fields can be included in the history cache that indicate whether or not the operation is permitted, and describing the conversions necessary to convert the operand into a permissible condition which would allow the operation in question. Other fields can be included in the history cache to aid in the operation of the function block.

Referring now to FIG. 3, an example of an embodiment of the information stored in a history cache is shown. History cache 300 stores a key for each operand used in the associated function, such as is shown by column 301 holding operand key 1, column 302 holding operand key 2, up to column 303 holding operand key n. Functions may use anywhere from 1 to n operands to perform their operations. Column 304 stores the result associated with the function the set of keys for the operands. If the set of keys is proper for the operation, the result column 304 may store a "yes", or "valid", indication. If the set of keys is not proper for the operation, the results column 304 may store a "no", or "invalid", indication, or may store an indication such as "transform", indicating that one or more of the operands can be transformed in some manner to make the operation proper. The action necessary can be stored in action column 305, such as a conversion from one type of unit to another unit, or a change in the scale or format of one of the operands. The transformation can apply either to the operand or to any of the metadata associated with an operand.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A system for verifying metadata in measurement processing systems, the system comprising:
   a process for associating a unique string with measurement data, the unique string representing a specific combination of metadata,
   at least one function block receiving the measurement data and associated unique strings and performing operations on the measurement data; and
   at least one history cache storing the unique strings, wherein the function block is able to look up the unique strings in the history cache to verify valid operations.

2. The system of claim 1 wherein the function block verifies a set of unique strings associated with a set of measurements to be operated on.

3. The system of claim 2 wherein the history cache stores instructions indicating how to manipulate the measurement data to convert the measurement data into a valid format for the function block.

4. The system of claim 1 wherein each of the at least one function blocks is associated with a particular one of the at least one history caches.

5. The system of claim 1 wherein a centralized history cache is utilized by multiple function blocks.

6. The system of claim 1 wherein the function blocks are implemented in software.

7. The system of claim 1 wherein the function blocks are implemented in gate arrays.

8. A method of verifying metadata associated with measurements in measurement processing systems, comprising:
   associating a key with a specific combination of the metadata;
   verifying that a particular operation involving the measurement associated with the key is valid based on the value of the key; and
   storing the key and the verification in a history cache, wherein the particular operation is performed by a function block associated with the history cache.

9. The method of claim 8 wherein the particular operation involves more than one measurement and the verification is performed on a set of keys.

10. The method of claim 8 further comprising generating a key for metadata not associated with a key.

11. The method of claim 8 wherein associating a key with a specific combination of metadata is performed by a measurement generation device.

12. The method of claim 8 further comprising aborting the particular operation when the verification fails.

13. The method of claim 8 further comprising performing the particular operation when the verification is successful.

14. The method of claim 8 further comprising verifying the particular operation using the metadata if the key cannot be verified.

15. The method of claim 14 further comprising storing the key and the results of the verification.

16. A system for verifying operations based on metadata in measurement processing systems, the system comprising:
   means for generating measurements and an associated set of metadata;
   means for associating a key to the associated set of metadata;
   means for performing an operation on a combination of measurements;
   means for storing previous verification results for specific sets of keys; and
   means for verifying the operation by checking a set of keys associated with the combination of measurements against the verification results in the means for storing.

17. The system of claim 16 wherein each key corresponds to exactly one combination of metadata.

18. The system of claim 16 wherein each means for performing an operation is associated with a particular means for storing.

* * * * *

UNITED STATES PATENT AND TRADEMARK OFFICE
CERTIFICATE OF CORRECTION

PATENT NO. : 7,343,266 B2 Page 1 of 1
APPLICATION NO. : 11/289810
DATED : March 11, 2008
INVENTOR(S) : Liu et al.

It is certified that error appears in the above-identified patent and that said Letters Patent is hereby corrected as shown below:

On the Title page, in field (75), in "Inventors", in column 1, line 2, delete "Hamilson," and insert -- Hamilton, --, therefor.

Signed and Sealed this

Fifth Day of August, 2008

JON W. DUDAS
*Director of the United States Patent and Trademark Office*